United States Patent [19]

Aarts et al.

[11] Patent Number: 4,808,011

[45] Date of Patent: Feb. 28, 1989

[54] GUIDE ARRANGEMENT FOR GUIDING AN OBJECT ALONG A KINKED PATH

[75] Inventors: Petrus Aarts; Cornelis Versluijs; Pieter D. Schuitmaker, all of Eindhoven, Netherlands

[73] Assignee: U.S. Philips Corporation, New York, N.Y.

[21] Appl. No.: 173,953

[22] Filed: Mar. 28, 1988

[30] Foreign Application Priority Data

Apr. 24, 1987 [NL] Netherlands .................. 8700968

[51] Int. Cl.⁴ .............................................. F16C 29/02
[52] U.S. Cl. .................................. 384/9; 360/96.5; 360/96.6; 384/42
[58] Field of Search .................. 384/9, 17, 22, 23, 42; 360/96.6, 96.5

[56] References Cited

U.S. PATENT DOCUMENTS

| 1,053,117 | 2/1913 | Tyden | 384/17 |
| 4,320,424 | 3/1982 | Murayama | 360/96.6 |
| 4,480,878 | 11/1984 | Leiper | 384/22 |
| 4,741,628 | 5/1988 | Kinley | 384/40 |

Primary Examiner—Lenard A. Footland
Attorney, Agent, or Firm—F. Brice Faller

[57] ABSTRACT

A stationary guide plate (11) is formed with two locally intersecting profiled grooves (12, 13), which are profiled in conformity with a kinked path having a first and a second path section which are inclined relative to each other and of which a first groove (12) has a smaller width and a greater depth than a second groove (13). The profiled grooves (12, 13) are engaged by guide members (14, 15) which are connected to the object carrier (22) so as to be movable in the profiled grooves, and which have a transverse dimension corresponding at least substantially to the width of the respective profiled grooves.

5 Claims, 5 Drawing Sheets

GUIDE ARRANGEMENT FOR GUIDING AN OBJECT ALONG A KINKED PATH

BACKGROUND OF THE INVENTION

The invention relates to a guide arrangement for guiding an object over a kinked path having first and second path path sections which are inclined relative to one another. An object carrier is movable along the path, a stationary guide plate having a plurality of mutually offset profiled grooves profiled in conformity with the path. Guide members connected to the object carrier engage the profiled grooves so as to be movable in the grooves, and have a transverse dimension corresponding at least substantially to the width of the respective profiled grooves.

Such a guide arrrangement is disclosed in U.S. Pat. No. 4,320,424 and is intended for guiding a magnetic-tape cassette to its operating position in a magnetic-tape apparatus by means of the object carrier via the front side of this apparatus. The magnetic-tape cassette is transported over a path comprising a horizontal and vertical path section. During this transport guidance is provided by profiled grooves each having portions which extend in the guide plate in conformity with the respective path sections. During the transition from the horizontal to the vertical path section the guide members of the object carrier, which are constructed as rollers, experience a certain instability. This instability occurs in the kink of the path and hence in the bends of the profiled grooves where the tangent to the path is perpendicular to the line interconnecting the rollers. In order to compensate for this instability the guide plate of the known guide arrangement has a first and a second profiled groove, which are disposed in line horizontally, and a third profiled groove, which is disposed at a lower level, resulting in a comparatively large overall height and depth of the object carrier and the guide plate and hence of the guide arrangement.

SUMMARY OF THE INVENTION

The guide plate has two profiled grooves, of which a first profiled groove has a smaller width and a greater depth than a second profiled groove, the guide member extends in the first profiled groove to a point beyond the bottom of the second profiled groove, and the two profiled grooves intersect each other locally.

The conbination of a comparatively deep and narrow groove with a comparatively shallow and wide groove enables a satisfactory stability to be obtained in the kink between the two path sections, the stability in the remainder of the path of the object carrier being also adequate. The use of two locally intersecting profiled grooves in the guide plate results in comparatively small overall dimensions of the guide plate and the object carrier, which, also considering the small number of parts, renders the guide arrangement suitable for use in equipment of compact construction. Examples of such equipment are magnetic-tape-cassette apparatuses of the 8-mm video type and of the R-DAT type, which apparatuses, when intended for mobile use, must have small dimensions and require an effective guide arrangement for the magnetic-tape cassettes. However, the invention can also be used advantageously in other equipment, such as record players and card readers, where the favourable combination of compactness and a stable guidance over two inclined path sections is important.

In a preferred embodiment the second path section of the first profiled groove intersects the first path section of the second profiled groove. If the second path section of the first profiled groove is vertical and intersects the horizontal first path section of the second profiled groove, the first profiled groove with the first path section can be situated above the second profiled groove, thereby ensuring a stable guidance, also in the kink between the two path sections, by means of a guide arrangement of comparatively small overall height.

In another preferred embodiment the location where the two profiled grooves intersect one another in the guide plate is situated near that end of the second path section of the first profiled groove which is remote from the first path section. This location of the intersection enables a high stability to be obtained in the bends of the two profiled grooves.

When the path is substantially L-shaped, the first path section is the longer section, and, viewed in the direction of the path from the first towards the second path section, the first profiled groove is situated partly before the second profiled groove in the guide plate, the first path section of the first profiled groove in the guide plate can be situated at that side of the first path section of the second profiled groove which is remote from the second path section. This arrangement also increases the stability of the guidance in the kink of the path and further results in a smaller overall height and depth of the guide arrangement.

The first profiled groove can be a slot in the guide plate. In this way the first profiled groove can readily be the groove having the greater depth. This means that during manufacturing it is not necessary to form the depth of the grooves with a very high accuracy.

DETAILED DESCRIPTION OF THE PREFERRED EMBODIMENTS

Figure 1:
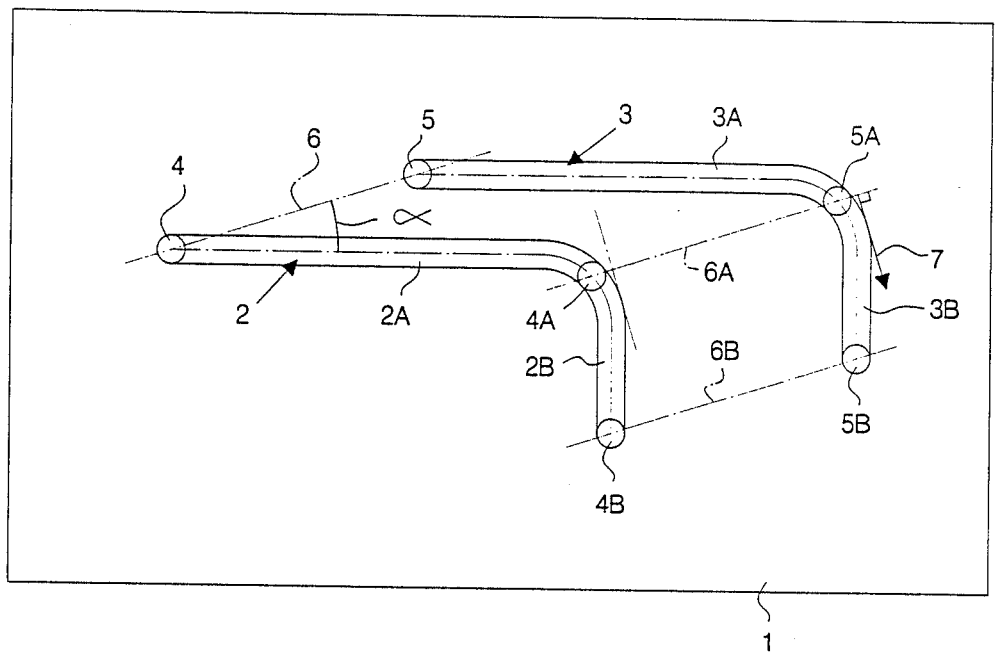
FIG. 1 is a diagrammatic view of a guide plate of a prior-art guide arrangement, the guide members being shown in three positions.

For a better understanding of the invention FIG. 1 diagrammatically shows a prior-art guide arrangement comprising a guide plate 1 in which two congruent profiled grooves 2 and 3 of the same width and depth are formed. The profiled grooves comprise groove portions 2A, 2B and 3A, 3B respectively, which are oriented in the same way as the path sections of a kinked path along which guide members 4 and 5 are guided during the movement over the path. Hereinafter the groove portions of the slots 2 and 3 will be referred to as path sections. The guide members 4 and 5 are constructed, for example, as pins or rollers, and in a manner not shown they are connected to an object carrier which is moved over the kinked path as it is guided along the path sections. This guiding movement comprises a horizontal movement followed by a vertical movement of the object carrier, referred to as an X-Y movement. In such guide arrangements guide plates with profiled grooves as shown in FIG. 1 are arranged at opposite sides of the object carrier. At the transition from the X to the Y movement the guide members are situated in the bends between the first and second path sections 2A, 2B and 3A, 3B respectively. In FIG. 1 this position of the guide members is indicated by the reference numerals 4A and 5A respectively. A connecting line 6 between the two guide members is now in the position indicated by the reference numeral 6A. The tangent to the path of the guide members, indicated by the reference numeral 7, now extends perpendicularly to the connecting line 6A. In this situation the guide member 5A can perform a rotary movement about the centre of the guide member 4A. This implies that in the bend between the two path sections an instability occurs during the guidance of the guide members. Preferably, the angle α between the connecting line 6 and the first path section in the prior-art guide arrangement is positive. Indeed, in the case of a negative angle the situation will arise that the entire first profiled groove must be situation above or before the other profiled groove, so that the guide plate must have a relatively larger overall height or depth.

Figure 2:
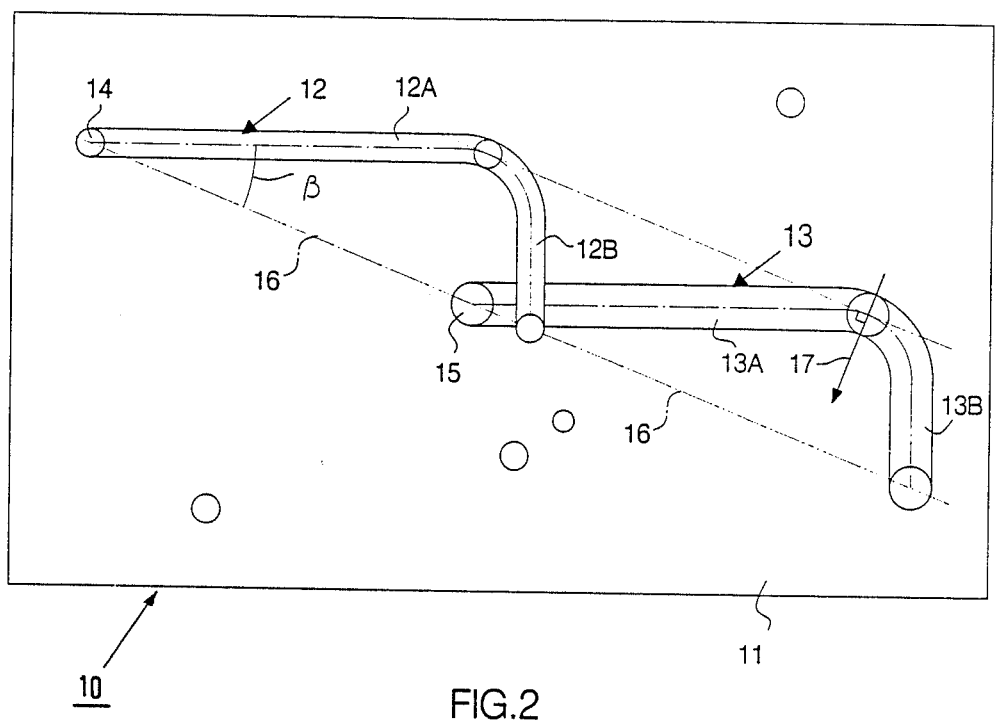
FIG. 2 is a diagrammatic view of a guide plate of a guide arrangement in accordance with the invention, the guide members also being shown in three positions.
Figure 3:
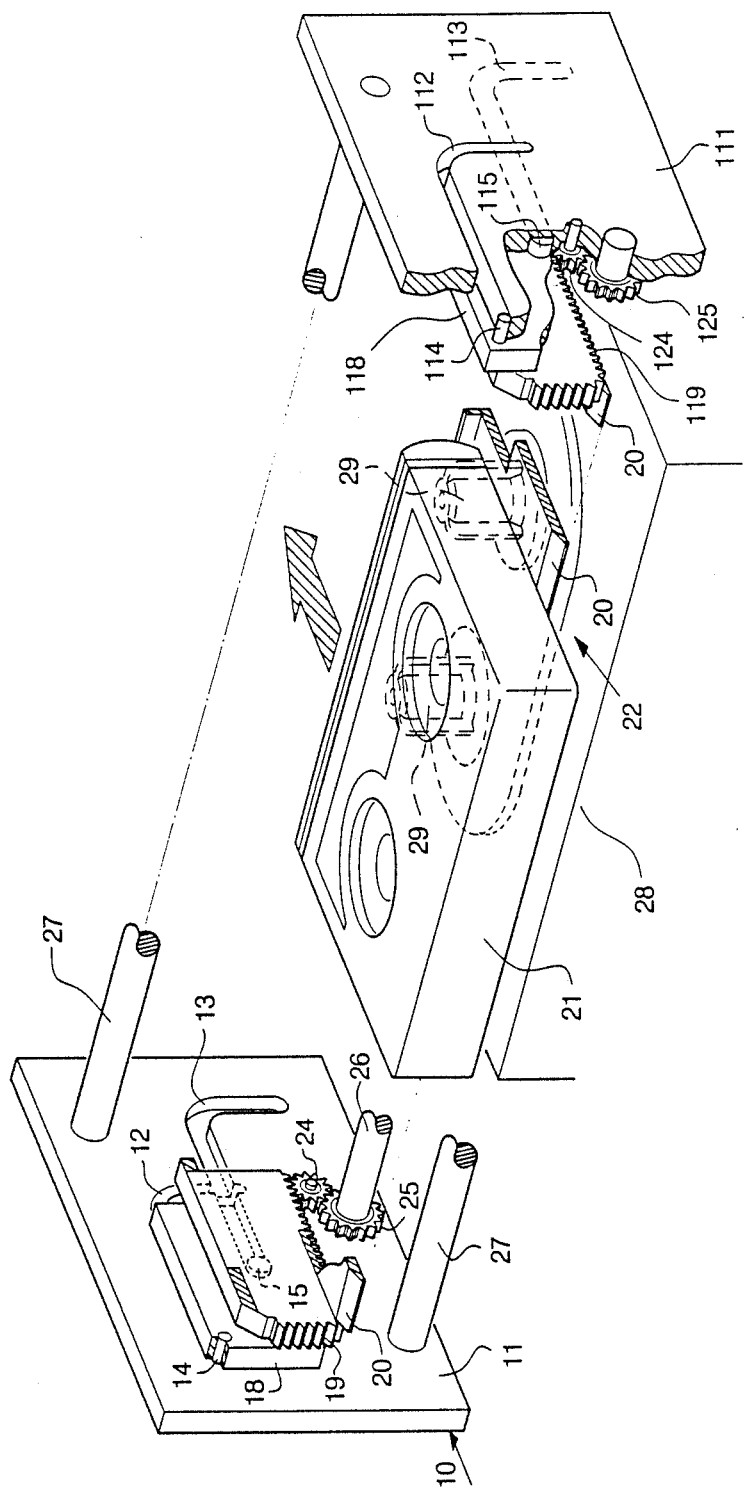
FIG. 3 is a partly perspective view of the guide arrangement in accordance with the invention, the guide members with the object carrier being shown in a first position after insertion of a magnetic-tape cassette.
Figure 4:
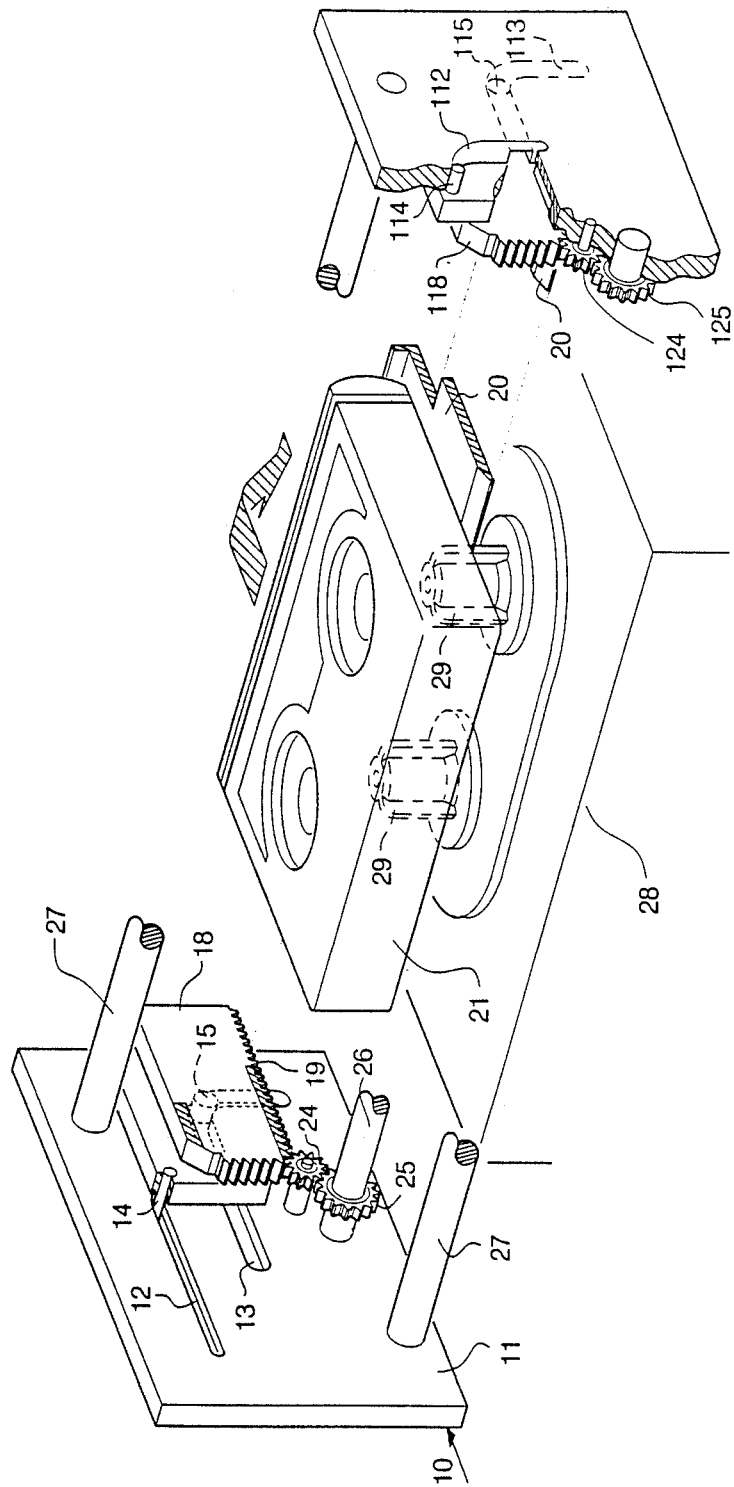
FIG. 4 is a perspective view of the guide arrangement shown in FIG. 3, the guide members and the object carrier being shown as they move in the path at the kink between the first and the second path section.
Figure 5:
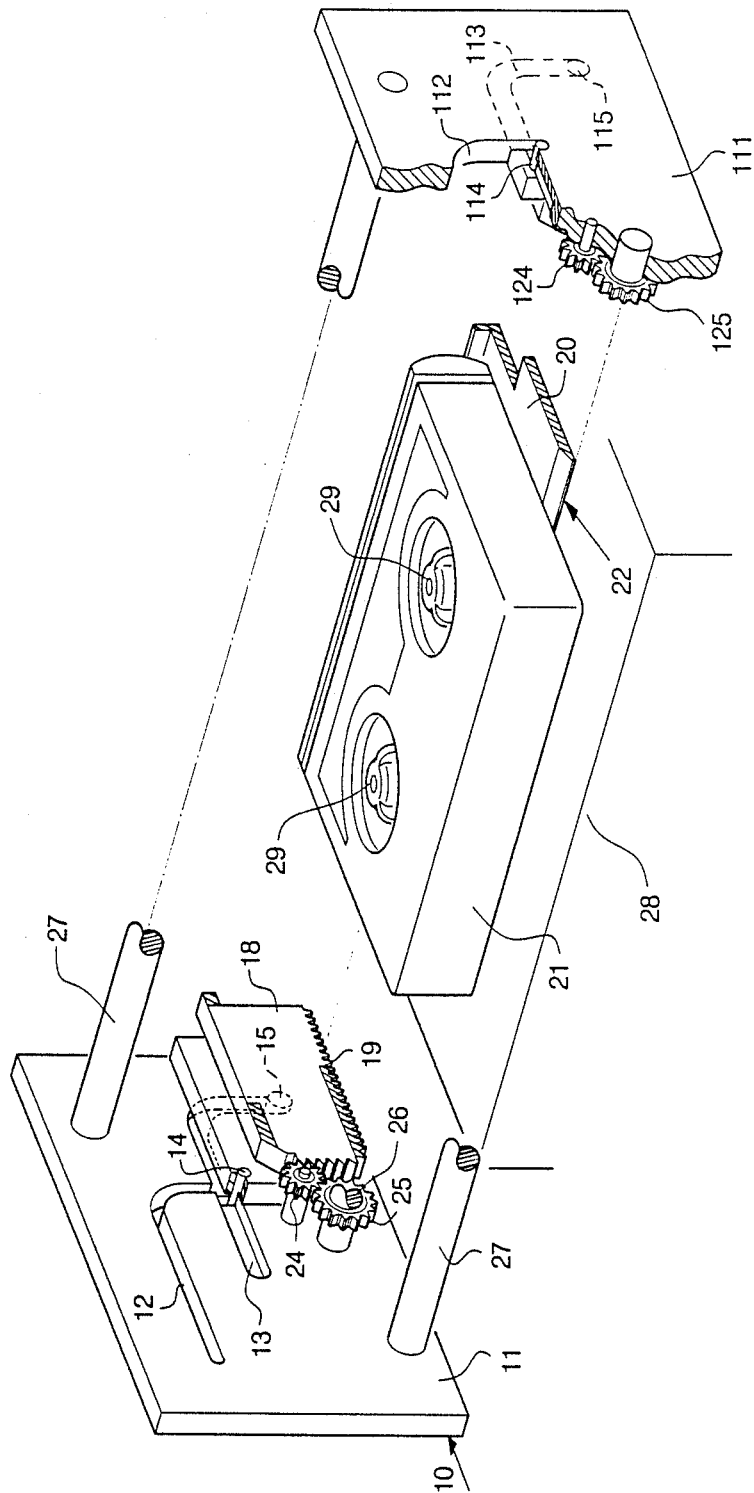
FIG. 5 is a perspective view of the guide arrangement shown in FIG. 3, the guide members and the object carrier being situated at the end of the second path section.

In the guide arrangement in accordance with the invention, shown diagrammatically in FIG. 2 and in perspective view of FIGS. 3 to 5, a maximum stability is obtained as the guide members proceed from the first to the second path section. For this purpose the guide arrangement 10 has two guide plates 11 and 111, which are arranged mirror-symmetrically relative to one another and which at their facing sides are formed with profiled grooves 12, 112 and 13, 113 respectively. The profiled grooves, as is clearly shown in FIG. 3, have different profiles. The first profiled groove 12, 112 is constructed as a slot in the guide plate 11, 111 and as a smaller width than the second profiled groove 13, 113, which is constructed as a channel in a guide plate. Therefore, the first profiled grooves have a greater depth than the second profiled grooves, whereas the second profiled grooves have a larger width than the first profiled grooves. The profiled grooves each comprise two path sections. FIG. 2 shows that the profiled groove 12 has path sections 12A and 12B and the profiled groove 13 has path sections 13A and 13B. The path sections extend horizontally and vertically respectively, but it is to be noted that other paths providing X and Y guidance are also possible. The profiled grooves 12 and 13 are disposed in such a way that the second path section 12B intersects the first path section 13A near that end of the second path section 12B which is remote from the first path section 12A. Viewed in the direction from the first towards the second path section the first profiled groove 12 is situated mainly before the profiled groove 13, whereas the first path section 12A in the guide plate 11 is situated at the side of the first path section 13A which is remote from the second path section 13B. The same applies to the profile grooves 112 and 113 in the guide plate 111.

The profiled grooves are engaged by guide members which in the present embodiment comprise pins 14, 15 and 114, 115 respectively. The pins must have a width adapted to the width of the relevant profiled groove, whilst the pin 14 or 114 extends into the profiled groove beyond the bottom of the respective profiled groove 13 or 113. A connecting line between the pins 14 and 15 is indicated by the reference numeral 16 in FIG. 2.

This adaptation of the groove shape and the pin shape ensures that the relevant pins 14 or 15 cannot become disengaged from the groove although the two grooves intersect one another. The connecting line 16 between the pins 14 and 15 may now extend at a negative angle β to the first path section, because the total height occupied by the grooves in the guide plate 11 is comparatively small on account of the intersection of the two profiled grooves. The same applies to the pins 114 and 115 in the guide plate 111.

The guide members 14, 15 and 114, 115 are mounted on a carrier plate, 18 and 118 respectively, which is provided with a gear rack 19 and 119 respectively both on a horizontal and a vertical side. The carrier plate 18 and the facing carrier plate 118 are interconnected, the interconnecting parts being largely omitted for clarity of the FIGS. 3 to 5. The ends and the central portion of a basic member which extends between the two carrier plates 18 and 118 are shown. The carrier plates 18 and 118 together with the basic member 20 constitute an object carrier 22 on which a cassette can be positioned, which object carrier can be moved along the kinked path by means of the guide arrangement 10. The object carrier is driven by means of pinions 24 and 124, which are driven by gear wheels 25 and 125 respectively, mounted on a central shaft 26 which is driven by an electric motor, not shown. When the pins pass through the first path sections of the profiled grooves 12 and 13, the pinion 24 meshes with the horizontal part of the gear rack 19 and after the pins have passed the bends in the profiled grooves the pinion 24 meshes with the vertical part of the gear rack 19. In this way the guide members 14, 15 and 114, 115 respectively are guided by the profiled grooves to drive the object carrier 22. In the present embodiment the object carrier is thus moved along a substantially L-shaped path. In this respect it is important that, as is shown in FIG. 2, during the movement through the bend in the profiled grooves 12 and 13, where the tangent to the path extends perpendicularly to the connecting line 16 between two guide members 14 and 15, is suitably oriented to provide maximum stability in the bend. The position of the object carrier 23 in this bend is illustrated in FIG. 4.

The guide plates 11 and 111 are interconnected by connecting elements 27, shown diagrammatically and are arranged stationarily inside the housing of an apparatus, in the present embodiment a magnetic-tape-cassette apparatus. Of this apparatus a frame 28 is shown, which carries two winding spindles 29 which, after the magnetic-tape cassette has been lowered along the L-shaped path, cooperate with the reel hubs of the cassette 21 (FIG. 5). Thus, the guide arrangement 10 in accordance with the invention enables the cassette to be loaded into the apparatus shown in a very effective manner.

In principle, the guide arrangement can be used advantageously in all apparatuses where a compact housing is required and where a highly stable guidance is essential. Examples of this are magnetic-tape apparatuses of the 8-mm video type or the R-DAT type. However, it is to be noted that the guide arrangement in accordance with the invention is also very suitable for use in equipment of a different type, such as record players, card readers etc.

Moreover, it is to be noted that on account of the highly stable guidance by the guide plate 11 and the guide members 14 and 15 the guide plate 111 and the guide members 114 and 115 at the right-hand side of the guide arrangement may be dispensed with, in which situation the guide means for the object carrier at the right-hand side may be simplified, for example by connecting at the right-hand side only one guide member to the object carrier and guiding it in an L-shaped groove. This may be the case, for example, if a small object having a small overall width is to be guided.

What is claimed is:

1. A guide arrangement (10) for guiding an object (21) over a kinked path comprising a first and a second path section, which path sections are inclined relative to one another, comprising:
    an object carrier (22) which is movable along the path,
    at least one stationarily arranged guide plate (11) having a plurality of mutually offset profiled grooves (12, 13) profiled in conformity with said path, and
    guide members (14, 15) which are connected to the object carrier (22), which engage the profiled grooves (12, 13) so as to be movable in said grooves, and which have a transverse dimension corresponding at least substantially to the width of the respective profiled grooves, characterized in that the guide plate (11) has two profiled grooves (12, 13), of which a first profiled groove (12) has a smaller width and a greater depth than a second profiled groove (13), the guide member (14) extends in the first profiled groove (12) to a point beyond the bottom of the second profiled groove (13), and the two profiled grooves (12, 13) intersect each other locally.

2. A guide arrangement as claimed in claim 1, characterized in that the second path section (12B) of the first profiled groove (12) intersects the first path section (13A) of the second profiled groove (13).

3. A guide arrangement as claimed in claim 2, characterized in that the location where the two profiled grooves (12, 13) intersect one another in the guide plate (11) is situated near that end of the second path section (12B) of the first profiled groove (12) which is remote from the first path section (12A).

4. A guide arrangement as claimed in claim 2, in which the path is substantially L-shaped, in which the first path section (12A) is the longer section, and in which, viewed in the direction of the path from the first towards the second path section (12B), the first profiled groove (12) is situated partly before the second profiled groove (13) in the guide plate (11), characterized in that the first path section (12A) of the first profiled groove (12) in the guide plate (11) is situated at that side of the first path section (13A) of the second profiled groove (13) which is remote from the second path section (13B).

5. A guide arrangement as claimed in claim 1, characterized in that the first profiled groove (12) is a slot in the guide plate (11).

* * * * *